United States Patent [19]
Grossman et al.

[11] Patent Number: 5,436,891
[45] Date of Patent: Jul. 25, 1995

[54] METHOD AND SYSTEM FOR TRAFFIC MANAGEMENT IN CELL RELAY NETWORKS

[75] Inventors: Daniel B. Grossman, Norwood; Michael G. Hluchyj, Wellesley, both of Mass.

[73] Assignee: Motorola, Inc., Schaumburg, Ill.

[21] Appl. No.: 181,681

[22] Filed: Jan. 14, 1993

[51] Int. Cl.6 ............................................. H04L 12/56
[52] U.S. Cl. ..................................... 370/60; 370/94.3
[58] Field of Search .................. 370/16, 16.1, 60, 84,
370/58.1, 58.2, 58.3, 94.1, 94.3, 85.12, 825.01,
827; 371/8.1, 8.2; 455/8

[56] References Cited

U.S. PATENT DOCUMENTS

| | | |
|---|---|---|
| 4,190,821 | 2/1980 | Woodward .................. 370/16.1 |
| 4,446,551 | 5/1984 | Seo ............................. 370/16.1 |
| 5,333,130 | 7/1994 | Weissmann et al. ............ 370/16 |

*Primary Examiner*—Benedict V. Safourek
*Attorney, Agent, or Firm*—Darleen J. Stockley

[57] ABSTRACT

A combination of an end-to-end closed-loop rate control mechanism for controlling the flow of cells entering a cell relay communication network from an end system, along with a segment traffic control mechanism for protecting the segment against misbehaving or malfunctioning destination end systems provides a novel, more efficient traffic management system and method for cell flow regulation in a cell relay communication network.

10 Claims, 6 Drawing Sheets

600

METHOD AND SYSTEM FOR TRAFFIC MANAGEMENT IN CELL RELAY NETWORKS

FIELD OF THE INVENTION

This invention relates generally to methods of network traffic management, and more particularly to network traffic management in a cell relay network.

BACKGROUND

It is well known that ATM networks are subject to congestion when the traffic offered to the network exceeds the capacity of the network. Such congestion conditions need to be controlled in order to guarantee, for each ATM connection, the Quality of Service (QOS) negotiated between the communicating end systems and ATM network during call establishment.

Recommendations for traffic control and congestion control in ATM networks are contained in ITU-T (Telecommunication Standardization Sector of the International Telecommunication Union, formerly CCITT) Recommendation I.371 and in the ATM Forum UNI 3.0 Specification. One of the congestion control mechanisms defined in these recommendations is the Explicit Forward Congestion Indication (EFCI). This is an optional mechanism that may be used to assist the network in the avoidance of and recovery from a congested state. A network element (e.g., a cell buffer queue feeding an internodal link) that is in a congested state may set the EFCI in the header of cells passing through it to indicate the existence of congestion (in the direction of the cell flow) to the destination end system. Cells when first introduced into the network by the source end system have the value of this indication set to "congestion not experienced." Also, a network element that is not congested is not allowed to modify the value of this indication. Hence, if a cell encounters at least one network element that is congested along the path of its ATM connection, the destination end system is informed of this congested state via the EFCI in the cell header. Although not specified in either I.371 or the ATM Forum UNI 3.0 Specification, it is suggested that the EFCI may be used to implement higher layer protocols in the end systems that adaptively lower the cell rate during congestion. Studies of feedback-based congestion control mechanisms that may make use of EFCI show promise of achieving effective, yet simple, congestion control in ATM networks.

Despite the simplicity of an end-to-end congestion control mechanism based on EFCI, there is concern that such a mechanism would not provide effective control over misbehaving or malfunctioning end systems. That is, suppose the end systems for an ATM connection do not react appropriately to the indication of congestion carried by EFCI (e.g., do not reduce the cell rate for the connection). Other end systems that are appropriately reacting to congestion indications may be at a disadvantage and, in some cases, may not even obtain the QOS guaranteed to their ATM connections. This has led to other traffic management proposals that require the generation of special traffic management (TM) cells from different points in the network (edge and/or intermediate) back toward the source end system. These cells effectively form a backward indication of congestion.

The advantage of using network (rather then end system) generated TM cells is that the network does not have to depend on the destination end system to properly signal the congestion indication back to the source end system. Moreover, the traffic policing (referred to as User Parameter Control) functions, usually performed at the source edge node of the network, can use these backward TM cells to implement protective traffic management mechanisms.

However, the generation of backward TM cells for each ATM connection represents a considerable complexity burden to the processing of ATM cells at edge and intermediate nodes in the network. Moreover, unlike the EFCI indications which are forwarded in cell headers of normal end system traffic, the backward TM cells consume link bandwidth resources and may be generated from multiple points in the network. This burden of backward indications is particularly evident when one is using a single ATM Virtual Path Connection (VPC) to carry multiple (say, 100s) of Virtual Channel Connections (VCCs). A single backward indication on a VPC across an ATM interface between two ATM networks may require the generation of a separate backward TM cell for each of the multiplexed VCCs.

Thus, there is a need for an efficient network traffic management method and system that combines an end-to-end closed-loop control method with the protection capabilities of a subnetwork-level feedback and policing function in a cell relay communication network.

BRIEF DESCRIPTIONS OF THE DRAWINGS

DETAILED DESCRIPTION OF A PREFERRED EMBODIMENT

Figure 1:
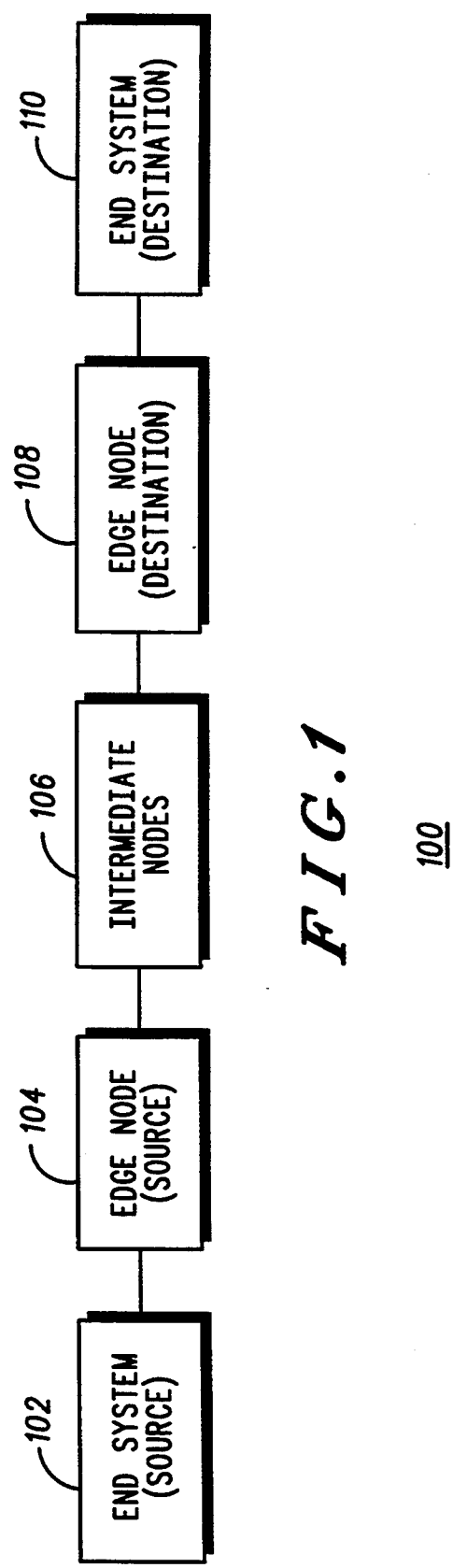
FIG. 1 is a block diagram illustrating ATM source and destination end systems coupled with an ATM network.

An ATM system may be configured as shown in FIG. 1, numeral 100, in which ATM source (102) and destination (110) end systems are coupled with an ATM network including: a source edge node (104), one or more intermediate nodes (where selected) (106), and a destination edge node (108). ATM cells generated by the source end system (102) are transmitted via the source edge node (104), intermediate nodes (106), and destination edge node (108) to the destination end system (110).

A wide variety of congestion control schemes are known. Hop-by-hop flow control techniques are popular in X.25 networks and have recently been proposed in the context of ATM networks. End-to-end rate-based schemes have been considered, and support for the forwarding of congestion indications is included in ATM and Frame Relay standards. Per-connection ingress buffering with dynamic rate control has been considered. In addition, as noted below, the concept of segment control cells is well known within the context of operations and maintenance in ATM networks. However, the combination of utilizing an end-to-end closed-loop rate control mechanism for controlling the flow of cells entering an ATM network from an ATM end system, along with a segment traffic control mechanism for protecting the segment against misbehaving or malfunctioning end systems is new.

The concept of an ATM network segment was introduced in the context of ATM Operations and Maintenance (OAM) control traffic flows in ITU-T Recommendation I.610, in which a segment flow is used for communicating operations information within the bounds of one or more links that are under the control of one administration or organization. A segment flow is used, for example, to check the connectivity of a particular segment of an ATM connection in the course of trouble-shooting a network fault. The administration/organization that controls the insertion of these OAM cells for the operations and maintenance of a VPC or VCC segment must ensure that such OAM cells are extracted before they leave the span of control of the administration/organization.

Figure 2:
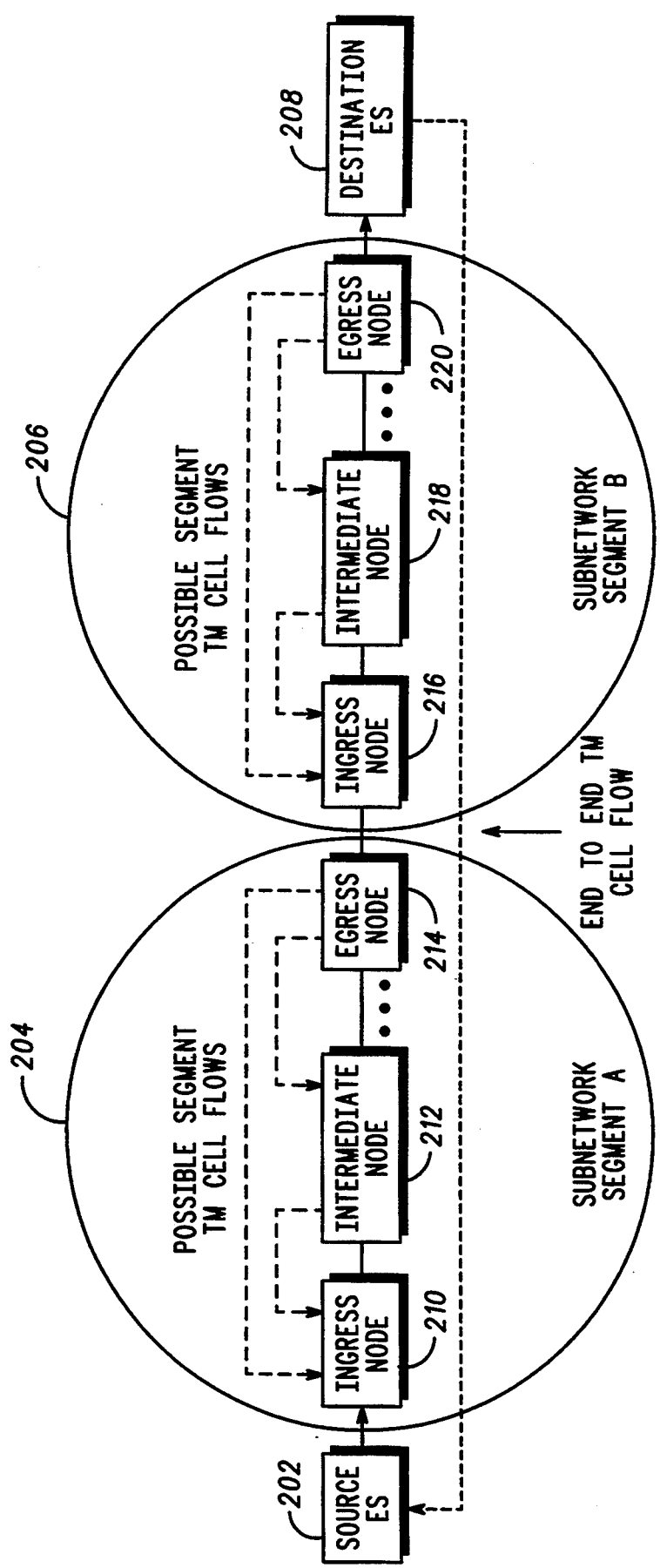
FIG. 2 shows an embodiment of a traffic management system (TMS) for providing cell flow regulation in a cell relay asynchronous transfer mode (ATM) communication network in accordance with the present invention.

FIG. 2, numeral 200, shows a block diagram of an embodiment of a system in accordance with the present invention. The present invention uses an end-to-end, closed-loop control mechanism to regulate the flow of cells entering the ATM network from a source end system for each connection. In addition, to protect against misbehaving or malfunctioning end systems, the network, or each of one or more interconnected subnetworks through which the ATM connection flows, selectively uses a segment congestion control function. Upon selection, the segment congestion control mechanism monitors, for each connection, the EFCI state in cells leaving the egress edge of the subnetwork, and then communicates congestion state changes via backward TM cells to the ingress edge of the subnetwork. At the ingress edge, congestion state changes selectively regulate the flow of cells entering the subnetwork. During periods of congestion, a buffer is used at the ingress edge for each connection to temporarily hold incoming cells to prevent a worsening of the congestion along the connection path in the subnetwork. The overflow of the subnetwork ingress buffer is avoided by the end-to-end control mechanism that regulates the flow of cells leaving the source end system for the connection. The end-to-end control mechanism is based on the EFCI received at the destination end system, with congestion state changes signaled back to the source end system using end-to-end backward TM cells.

A per-connection subnetwork ingress buffer, with segment TM cells used to regulate the flow of cells into the subnetwork, serves as a firewall to protect the subnetwork against misbehaving or malfunctioning end systems. When an end system does not adjust in response to congestion signaled by the EFCI in cells traversing the network, the ingress buffer serving its connection may overflow, resulting in only the loss of cells from the misbehaving or malfunctioning end system. Alternately, the segment may use backward TM cells originating from the point of congestion, traveling back toward the ingress edge of the subnetwork. In still another alternative, a hop-by-hop per-connection flow control can be used within the subnetwork, again making use of segment TM cells to regulate the flow of cells on each internodal link. Note, in addition, that different segments of the same connection can use different segment traffic management mechanisms.

In the present invention, the segment TM cells are not permitted to leave the defined subnetwork boundaries of the segment. The coupling of congestion control signaling between segments and across the ATM interface to end systems is through the end-to-end closed-loop rate control mechanism based on the EFCI and the end-to-end backward TM cells used to signal congestion state changes from the destination end system to the source end system.

FIG. 2, numeral 200, shows an embodiment of a traffic management system (TMS) for providing cell flow regulation in a cell relay asynchronous transfer mode (ATM) communication network in accordance with the present invention. The TMS includes a source end system (202), a source edge node (210), a plurality of nodes (212, 214, 216, 218), a destination edge node (220), and a destination end system (208). In the embodiment in FIG. 2, two subnetwork segments (A, 204; B, 206) are shown. Clearly, the number of subnetworks is selectable. In addition, each subnetwork illustrated includes: an ingress node (210, 216); where selected, an intermediate node (212, 218); and an egress node (214, 220). The number of intermediate nodes for each subnetwork is selectable. In addition, the ingress node of subnetwork segment A is utilized as the source edge node (210) and the egress node of subnetwork segment B is utilized as the destination edge node (220).

The source end system (202) is utilized for transmitting cells to a serially coupled plurality of traffic management nodes (210, 212, 214, 216, 218, 220). The traffic management nodes (210, 212, 214, 216, 218, 220) are utilized for providing pathway(s) for cells across the network and for utilizing a segment traffic control mechanism for protecting nodes in a segment of the network against malfunctioning end systems. The first of the plurality of traffic management nodes is an ingress node (210), and also functions as a source edge node. The ingress node (210) is operably coupled to the source end system (202) and is used for providing at least cell entry-exit. The last of the serially coupled plurality of traffic management nodes, the egress node (220) functions as a destination edge node, is serially coupled to the remainder of the serially coupled plurality of node(s), and is used for providing at least cell entry-exit. The destination end system (208) is operably coupled to the egress node (220) and is used for receiving cells. The source end system (202) and destination end system (208) implement an end-to-end closed-loop rate control mechanism for controlling the flow of cells entering the network.

The plurality of traffic management nodes (210, 212, 214, 216, 218, 220) typically include at least a first subnetwork (204, 206, . . . ) of nodes that generate traffic management (TM) cells that are sent to preselected prior nodes within the subnetwork for implementing the segment traffic control mechanism. The destinatiom end system (208) generates TM cells that are sent to the source end system for implementing the end-to-end closed-loop rate control mechanism. Each subnetwork (204, 206, ...) includes: (1) an ingress node (210, 216, ...) that is operably coupled to receive cells from the source end system (202) or an egress node (214) of another subnetwork and is used for regulating the flow of cells into the subnetwork in accordance with a predetermined received TM cell scheme; (2) where selected, at least a first intermediate node (212, 218, ...) that is operably coupled to the ingress node (210, 216, ...) and is used for providing a pathway for cells and for selectably sending TM cells to at least one of the ingress node and previous intermediate node(s) of the subnetwork; and (3) an egress node (214, 220, ...) that is operably coupled to the intermediate node(s) (212, 218, ...) for selectably providing TM cells to at least one of: the ingress node (210, 216, ...) of the subnetwork (204, 206, ...) and preselected intermediate node(s) (212, 218, ...), and for providing a pathway for cells to another subnetwork or the destination end system (208).

Figure 3:
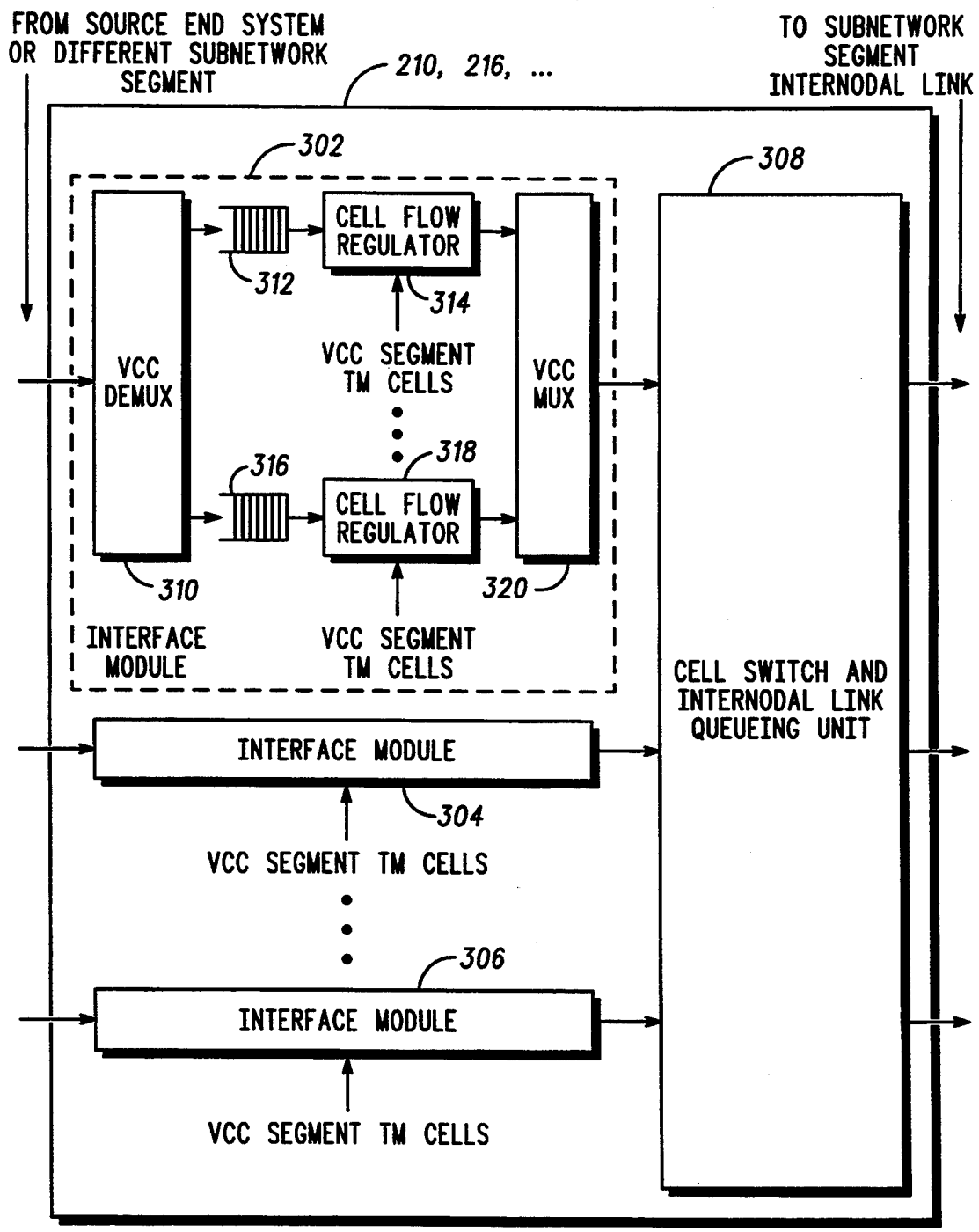
FIG. 3 shows an embodiment of the ingress node of FIG. 2 with greater particularity.

The segment traffic control mechanism is implemented by the ingress node (210, 216, ...), as shown in FIG. 3, numeral 300. The ingress node (210, 216, ...) typically includes a plurality (302, 304, 306, ...) of interface modules with per VCC (Virtual Channel Connection) cell buffers and per VCC segment controlled cell flow regulation, for regulating cell flow through the subnetwork, each operably coupled to receive cells from a source end system (202) or a subnetwork (204) other than the subnetwork (206) of the ingress node (216), and a cell switch and internodal link queueing unit (308) that is operably coupled to the plurality of interface modules (302, 304, 306, ...) and is used for providing predetermined internodal link queueing of cells from the interface modules (302, 304, 306, ...).

Each interface module (302, 304, 306, ...) typically includes a VCC demultiplexer (VCC DEMUX) (310), a plurality of buffers (312, 316, ...), a plurality of cell flow regulators (314, 318, ...), and a VCC multiplexer (VCC MUX) (320). The VCC DEMUX is operably coupled to receive and demultiplex cells from a source end system or a subnetwork other than the subnetwork of the ingress node. Each of the plurality of buffers (312, 316, ...) is coupled to the VCC DEMUX (310) and is used for temporarily holding incoming cells to prevent worsening of congestion along a connection path in the network. Each of the plurality of cell flow regulators (314, 318, ...) is operably coupled to one of the buffers and is used to receive TM cells from within the subnetwork utilizing a virtual channel connection (VCC), for regulating the cell flow according to a predetermined scheme. The VCC MUX (320) is operably coupled to the plurality of cell flow regulators (314, 318, ...) and is used for multiplexing received cells.

The end-to-end closed-loop rate control mechanism generally regulates the flow of cells leaving the source end system in accordance with Explicit Forward Congestion Indication (EFCI) cell information received at the destination end system, with state changes signaled back to the source end system using end-to-end (backward) TM cells.

Figure 4:
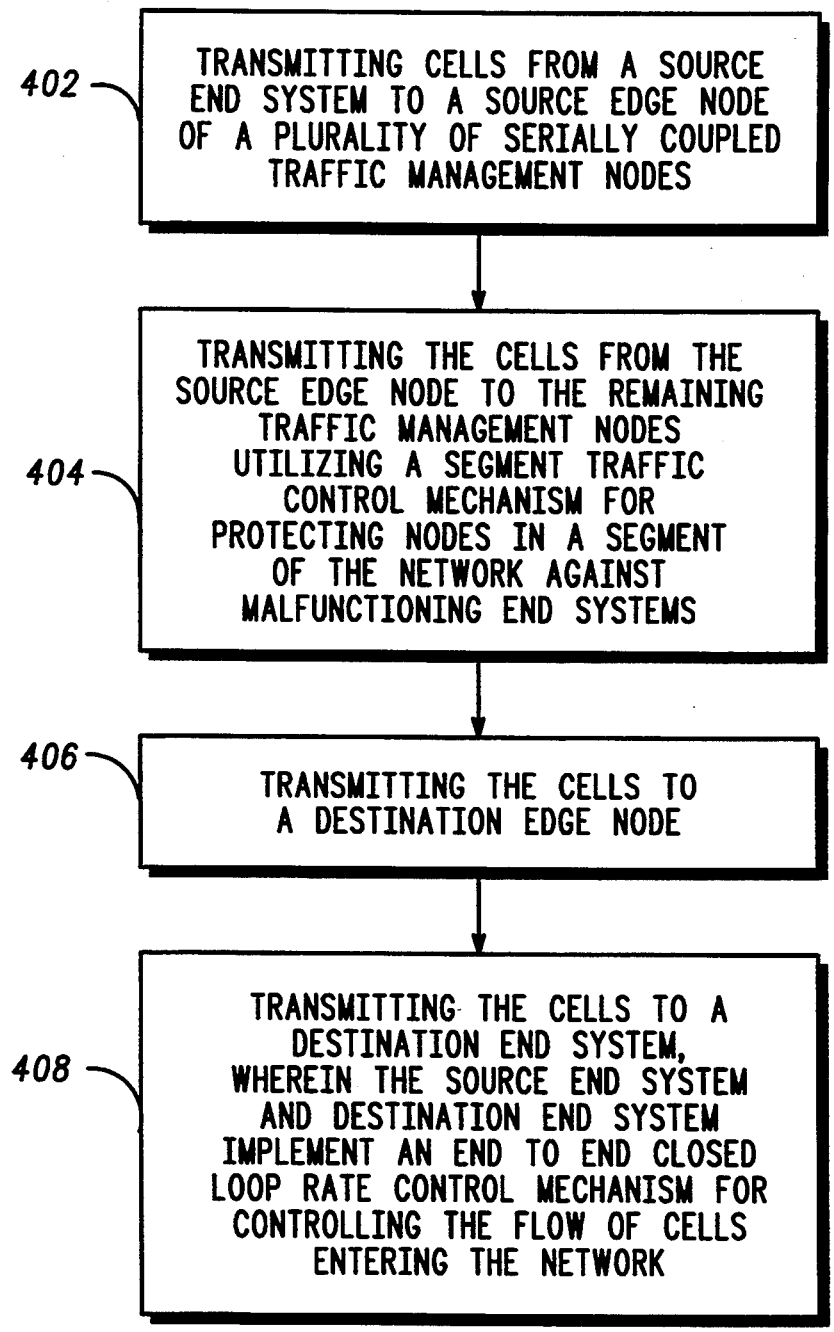
FIG. 4 shows a flow chart of the steps of an embodiment of a method in accordance with the present invention.

An embodiment of the method of the present invention, the steps of which are shown in a flow chart in FIG. 4, numeral 400, shows a traffic management method for providing cell flow regulation in a cell relay asynchronous transfer mode (ATM) communication network. The embodiment includes the steps of: (A) transmitting cells from a source end system to a source edge node of a plurality of serially coupled traffic management nodes (402); (B) transmitting the cells from the source edge node to the remaining traffic management nodes utilizing a segment traffic control mechanism for protecting nodes in a segment of the network against malfunctioning end systems (404); (C) transmitting the cells to a destination edge node (406), and (E) transmitting the cells to a destination end system, wherein the source end system and destination end system implement an end-to-end closed-loop rate control mechanism for controlling the flow of cells entering the network (408).

The method typically includes the plurality of serially coupled traffic management nodes generating traffic management (TM) cells that are sent to preselected prior nodes within the subnetwork for implementing the segment traffic control mechanism. The method further includes the destination end system (208) generating TM cells that are sent to the source end system for implementing the end-to-end closed-loop rate control mechanism.

Figure 5:
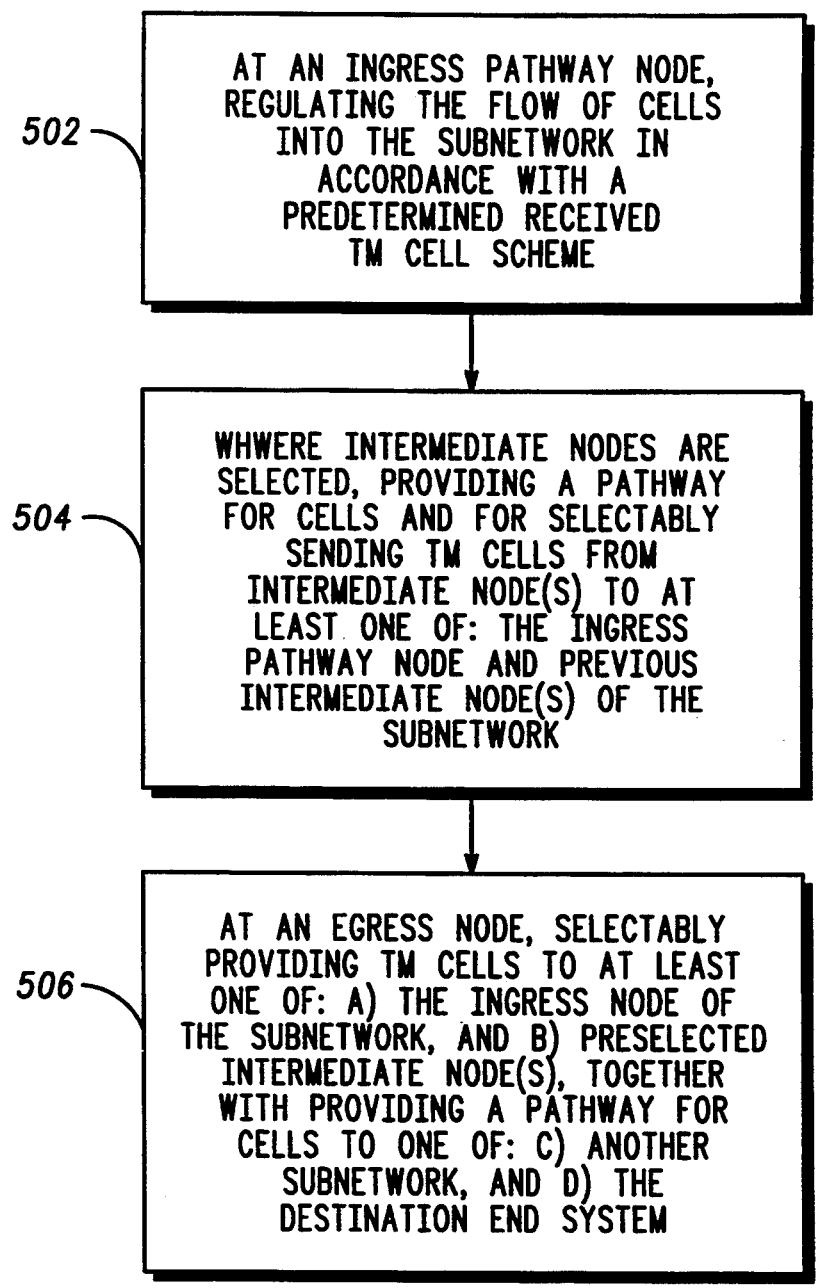
FIG. 5 shows a flow chart of the steps of one embodiment of transmitting the cells from the source edge node to the remaining traffic management nodes utilizing a segment traffic control mechanism for protecting nodes in a segment of the network against malfunctioning end systems in accordance with the present invention.

Typically, transmitting the cells from the source edge node to the remaining traffic management nodes utilizing a segment traffic control mechanism for protecting nodes in a segment of the network against malfunctioning end systems (404), shown in FIG. 5, numeral 500, includes: (1) at an ingress pathway node, regulating the flow of cells into the subnetwork in accordance with a predetermined received TM cell scheme (502); (2) where the intermediate nodes are selected, providing a pathway for cells and for selectably sending TM cells from intermediate node(s) (504) to at least one of: the ingress pathway node and previous intermediate node(s) of the subnetwork; and (3) at an egress node, selectably providing TM cells (506) to at least one of: (3a) the ingress node of the subnetwork, and (3b) preselected intermediate node(s), together with providing a pathway for cells to one of: (3c) another subnetwork, and (3d) the destination end system.

Figure 6:
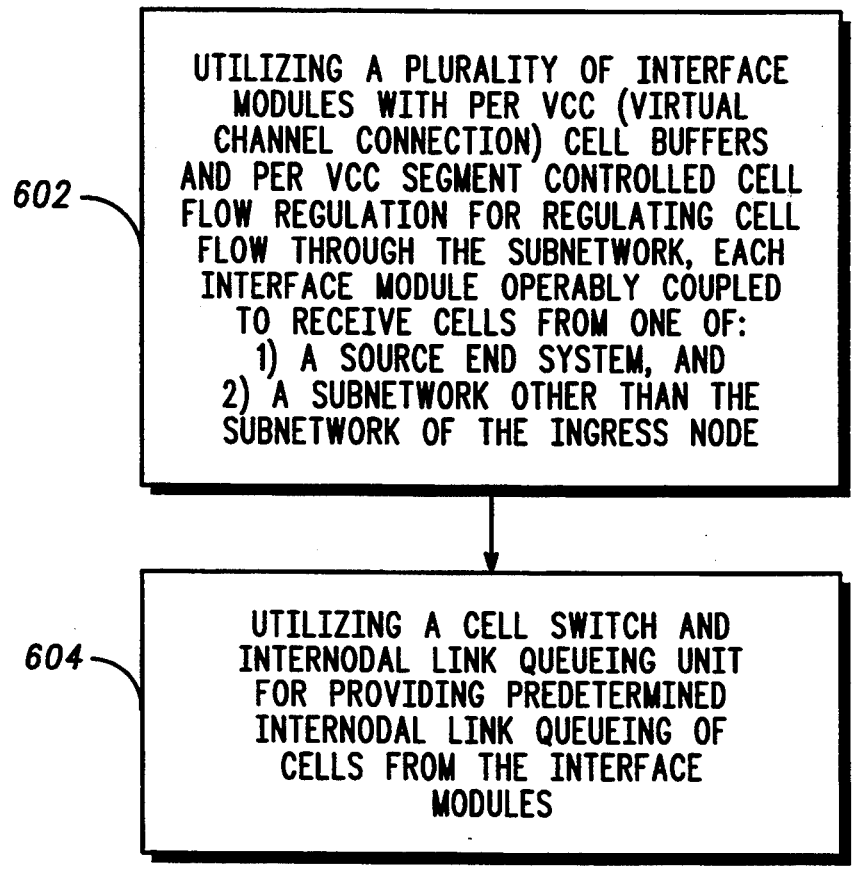
FIG. 6 shows a flow chart of the steps of one embodiment of implementing the segment traffic control mechanism of FIG. 5 by the ingress node in accordance with the present invention.

The segment traffic control mechanism, shown in FIG. 6, numeral 600, is implemented by the ingress node and may include the steps of: (A) utilizing a plurality of interface modules with per VCC (Virtual Channel Connection) cell buffers and per VCC segment controlled cell flow regulation for regulating cell flow through the subnetwork, each interface module operably coupled to receive cells from one of: (A1) a source end system, and (A2) a subnetwork other than the subnetwork of the ingress node (602), and (B) utilizing a cell switch and internodal link queueing unit for providing predetermined internodal link queueing of cells from the interface modules (604).

Utilizing a plurality of interface modules with per VCC (Virtual Channel Connection) cell buffers and per VCC segment controlled cell flow regulation, for regulating cell flow through the subnetwork, typically includes the steps of: (A) utilizing a VCC demultiplexer (VCC DEMUX), operably coupled for receive and demultiplexing cells from one of: (A1) a source end system, and (A2) a subnetwork other than the subnetwork of the ingress node; (B) utilizing a plurality of buffers for temporarily holding incoming cells to prevent worsening of congestion along a connection path in the network; (C) utilizing a plurality of cell flow regulators, each operably coupled to one of the buffers and to receive TM cells from within the subnetwork utilizing a virtual channel connection (VCC), for regulating the cell flow according to a predetermined scheme; and (D) utilizing a VCC multiplexer (VCC MUX) for multiplexing received cells.

The end-to-end closed-loop rate control mechanism includes the step of regulating the flow of cells leaving the source end system in accordance with Explicit Forward Congestion Indication cell information received at the destination end system, with state changes signaled back to the source end system using end-to-end (backward) TM cells.

Though, for cost/complexity tradeoffs, a vendor of subnetwork nodes can choose not to implement any segment congestion control mechanism and rely instead on the proper behavior of the end systems to avoid congestion problems, the segment congestion mechanism of the present invention provides added traffic control which may justify the cost and complexity, particularly for a public ATM wide area network.

Both the end-to-end TM cells and the segment TM cells may utilize the ATM Payload Type Indicator (PTI) encoding 110, which is reserved (but still undefined) in the ATM standards for future traffic control and management. A subnetwork that is not implementing a segment traffic management mechanism may ignore cells with this PTI encoding, since all such cells would be end-to-end TM cells. A subnetwork supporting a segment traffic management mechanism may utilize the information contained in both the end-to-end and segment TM cells. Again, all segment TM cells are not permitted to leave the boundaries of the segment, and all end-to-end TM cells can be examined but not altered or discarded by any segment.

Thus, the combination of an end-to-end closed-loop rate control mechanism for controlling the flow of cells entering an ATM network from an ATM end system, along with a segment traffic control mechanism for protecting the segment against misbehaving or malfunctioning end systems provides a novel, more efficient traffic management system and method for cell flow regulation in a cell relay asynchronous transfer mode (ATM) communication network.

It will be obvious to those skilled in the art that many alterations and modifications may be made without departing from the invention. Accordingly, it is intended that all such alterations and modifications be included within the spirit and scope of the invention as defined in the appended claims.

We claim:

1. A traffic management system, TMS, for providing cell flow regulation in a cell relay communication network, comprising:
    (A) a source end system, for transmitting cells to a source edge node,
    (B) a plurality of traffic management nodes, serially coupled to the source edge node, for providing pathway(s) for cells across the network and for utilizing a segment traffic control mechanism for protecting nodes in a segment of the network against malfunctioning end systems, including the source edge node, operably coupled to the source end system, for providing at least cell entry-exit, and a destination edge node, serially coupled to previous serially coupled plurality of node(s), for providing at least cell entry-exit, and
    (C) a destination end system, operably coupled to the destination edge node, for receiving cells whose flow is being regulated, wherein:
    the source end system and destination end system implement an end-to-end closed-loop rate control mechanism for controlling the flow of cells entering the network,
    wherein the plurality of traffic management nodes include:
    (D) at least a first subnetwork of nodes that generate traffic management, TM, cells that are sent to preselected prior nodes within the subnetwork for implementing the segment traffic control mechanism and
    (E) the destination end system that generates TM cells that are sent to the source end system for implementing the end-to-end closed-loop rate control mechanism.

2. The TMS of claim 1 wherein each subnetwork includes:
    (A) an ingress node, operably coupled to receive cells from one of:
        (A1) the source end system, and
        (A2) an egress node of another subnetwork, for regulating the flow of cells into the subnetwork in accordance with a predetermined received TM cell scheme,
    (B) where selected, at least a first intermediate node, operably coupled to the ingress node, for providing a pathway for cells and for selectably sending TM cells to at least one of: the ingress node and previous intermediate node(s) of the subnetwork,
    (C) an egress node, operably coupled to the intermediate node(s), for:
        (C1) selectably providing TM cells to at least one of:
            (C1a) the ingress node of the subnetwork, and
            (C1b) preselected intermediate node(s), and
        (C2) providing a pathway for cells to one of:
            (C2a) another subnetwork, and
            (C2b) the destination end system.

3. The TMS of claim 2 wherein the segment traffic control mechanism is implemented by the ingress node and the ingress node comprises:
    (A) a plurality of interface modules with per VCC (Virtual Channel Connection) cell buffers and per VCC segment controlled cell flow regulation, for regulating cell flow through the subnetwork, each operably coupled to receive cells from one of:
        (A1) a source end system, and
        (A2) a subnetwork other than the subnetwork of the ingress node, and
    (B) a cell switch and internodal link queueing unit, operably coupled to the plurality of interface modules, for providing predetermined internodal link queueing of cells from the interface modules.

4. The TMS of claim 3 wherein each interface module comprises:
    (A) a VOC demultiplexer (VCC DEMUX), operably coupled to receive and demultiplex cells from one of:
        (A1) a source end system, and
        (A2) a subnetwork other than the subnetwork of the ingress node,
    (B) a plurality of buffers, each coupled to the VCC DEMUX, for temporarily holding incoming cells to prevent worsening of congestion along a connection path in the network,
    (C) a plurality of cell flow regulators, each operably coupled to one of the buffers and to receive TM cells from within the subnetwork utilizing a virtual channel connection, VCCD, for regulating the cell flow according to a predetermined scheme, and (D) a VCC multiplexer (VCC MUX), operably coupled to the plurality of cell flow regulators, for multiplexing received cells.

5. The TMS of claim 1 wherein the end-to-end closed-loop rate control mechanism regulates the flow of cells leaving the source end system in accordance with predetermined Explicit Forward Congestion Indication cell information received at the destination end system, with congestion state changes signaled back to the source end system using end-to-end (backward) TM cells.

6. A traffic management method for providing cell flow regulation in a cell relay communication network, comprising the steps of:
- (A) transmitting cells from a source end system to a source edge node of a plurality of serially coupled traffic management nodes,
- (B) transmitting the cells from the source edge node to the remaining traffic management nodes utilizing a segment traffic control mechanism for protecting nodes in a segment of the network against malfunctioning end systems,
- (C) transmitting the cells to a destination edge node, and
- (D) transmitting the cells to a destination end system, wherein the source end system and destination end system implement an end-to-end closed-loop rate control mechanism for controlling the flow of cells entering the network, including the steps of:
- (E) the plurality of serially coupled traffic management nodes generating traffic management, TM, cells that are sent to preselected prior nodes within the subnetwork for implementing the segment traffic control mechanism, and
- (F) the destination end system generating TM cells that are sent to the source end system for implementing the end-to-end closed-loop rate control mechanism.

7. The traffic management method of claim 6 including, at the plurality of traffic management nodes, the steps of:
- (A) at an ingress pathway node, regulating the flow of cells into the subnetwork in accordance with a predetermined received TM cell scheme,
- (B) providing a pathway for cells and for selectably sending TM cells from intermediate node(s) to at least one of: the ingress pathway node and, where selected, previous intermediate node(s) of the subnetwork,
- (C) at an egress node, selectably providing TM cells to at least one of:
  - (C1a) the ingress node of the subnetwork, and
  - (C1b) preselected intermediate node(s), and
- (C2) providing a pathway for cells to one of:
  - (C2a) another subnetwork, and
  - (C2b) the destination end system.

8. The traffic management method of claim 7 wherein the segment traffic control mechanism is implemented by the ingress node and includes the steps of:
- (A) utilizing a plurality of interface modules with per VCC (Virtual Channel Connection) cell buffers and per VCC segment controlled cell flow regulation, for regulating cell flow through the subnetwork, each operably coupled to receive cells from one of:
  - (A1) a source end system, and
  - (A2) a subnetwork other than the subnetwork of the ingress node, and
- (B) utilizing a cell switch and internodal link queueing unit for providing predetermined internodal link queueing of cells from the interface modules.

9. The traffic management method of claim 8 wherein utilizing a plurality of interface modules with per VCC (Virtual Channel Connection) cell buffers and per VCC segment controlled cell flow regulation, for regulating cell flow through the subnetwork, includes the steps of:
- (A) utilizing a VCC demultiplexer (VCC DEMUX), operably coupled for receive and demultiplexing cells from one of:
  - (A1) a source end system, and
  - (A2) a subnetwork other than the subnetwork of the ingress node,
- (B) utilizing a plurality of buffers for temporarily holding incoming cells to prevent worsening of congestion along a connection path in the network,
- (C) utilizing a plurality of cell flow regulators, each operably coupled to one of the buffers and to receive TM cells from within the subnetwork utilizing a virtual channel connection, VCCD, for regulating the cell flow according to a predetermined scheme, and
- (D) utilizing a VCC multiplexer, VCC MUX, for multiplexing received cells.

10. The traffic management method of claim 6 wherein the end-to-end closed-loop rate control mechanism includes the step of regulating the flow of cells leaving the source end system in accordance with predetermined Explicit Forward Congestion Indication cell information received at the destination end system, with state changes signaled back to the source end system using end-to-end (backward) TM cells.

* * * * *

UNITED STATES PATENT AND TRADEMARK OFFICE
CERTIFICATE OF CORRECTION

PATENT NO. : 5,436,891
DATED : July 25, 1995
INVENTOR(S) : Daniel B. Grossman and Michael G. Hluchyj It is certified that error appears in the above-indentified patent and that said Letters Patent is hereby corrected as shown below:

Column 8, Line 54 "VOC"  --VCC--

Column 8, line 67 "VCCD" --VCC--

Column 10, Line 40 "VCCD" --VCC--

Signed and Sealed this

Third Day of October, 1995

Attest:

BRUCE LEHMAN

Attesting Officer

Commissioner of Patents and Trademarks